United States Patent [19]

Hluchyj et al.

[11] Patent Number: 5,231,633
[45] Date of Patent: Jul. 27, 1993

[54] METHOD FOR PRIORITIZING, SELECTIVELY DISCARDING, AND MULTIPLEXING DIFFERING TRAFFIC TYPE FAST PACKETS

[75] Inventors: Michael G. Hluchyj, Wellesley; Amit Bhargave, Somerville; Nanying Yin, Cambridge, all of Mass.

[73] Assignee: Codex Corporation, Canton, Mass.

[21] Appl. No.: 551,712

[22] Filed: Jul. 11, 1990

[51] Int. Cl.[5] .......................................... H04L 12/56
[52] U.S. Cl. ...................................... 370/94.1; 370/60
[58] Field of Search ............... 370/94.1, 110.1, 60, 370/53, 56, 85.1, 108, 61, 58.1, 58.3; 240/825.5, 825.52, 825.51, 825.02; 395/650

[56] References Cited

U.S. PATENT DOCUMENTS

| | | | |
|---|---|---|---|
| 4,475,192 | 10/1984 | Fernox et al. | 370/60 |
| 4,623,996 | 11/1986 | McMillen | 370/60 |
| 4,847,754 | 7/1989 | Obermarck et al. | 395/650 |
| 4,862,454 | 8/1989 | Dias et al. | 370/60 |
| 4,868,813 | 9/1989 | Suzuki | 370/60 |
| 4,894,824 | 1/1990 | Hemmady et al. | 370/58.3 |
| 4,901,348 | 2/1990 | Nichols et al. | 370/60 |
| 4,914,650 | 4/1990 | Sriram | 370/60 |
| 5,001,702 | 3/1991 | Teraslinna et al. | 370/94.1 |

OTHER PUBLICATIONS

Message delays with prioritized HOLP and Round-Robin Packet Servicing, John N. Daigle, Jun. 1987, pp. 609-619.

*Primary Examiner*—Douglas W. Olms
*Assistant Examiner*—Dang Ton
*Attorney, Agent, or Firm*—Darleen J. Stockley; Steven G. Parmelee; Charles L. Warren

[57] ABSTRACT

A queueing and dequeueing mechanism for use in an integrated fast packet network, wherein fast packets from differing traffic types are multiplexed with one another through use of a weighted round-robin bandwidth allocation mechanism (517). Fast packets within a particular traffic type are selected for transmission through use of a head of line priority service (514), a packet discard mechanism (516), or both. The weighted round-robin bandwidth allocation mechanism functions, in part, based upon a credit counter for each queue group that represents a particular traffic type.

31 Claims, 6 Drawing Sheets

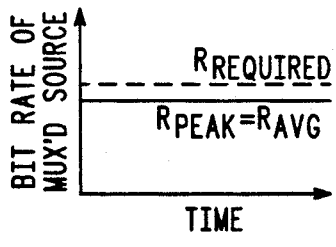
FIG.1A -PRIOR ART-
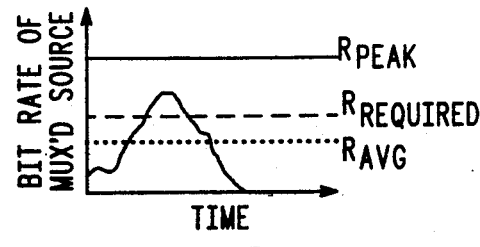
FIG.1B -PRIOR ART-
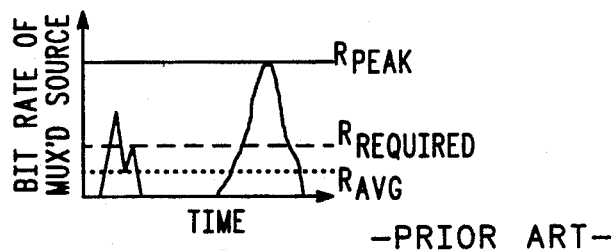
FIG.1C -PRIOR ART-
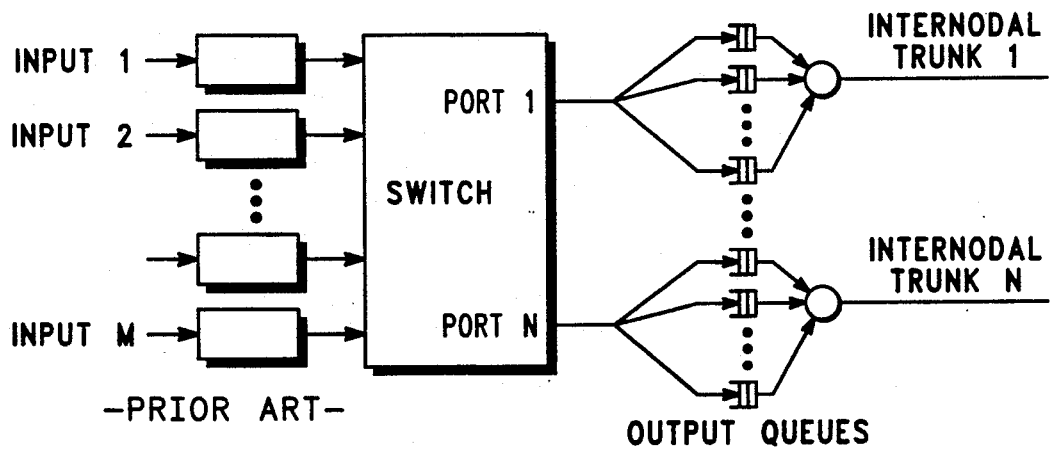
FIG.2 -PRIOR ART-
FIG.3A -PRIOR ART-
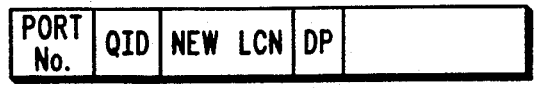
FIG.3B -PRIOR ART-

METHOD FOR PRIORITIZING, SELECTIVELY DISCARDING, AND MULTIPLEXING DIFFERING TRAFFIC TYPE FAST PACKETS

TECHNICAL FIELD

This invention relates generally to integrated fast packet networks, and more particularly to prioritization, at a network trunk node, of fast packets of a common traffic type, selective discarding of certain fast packets, and bandwidth allocation through multiplexing of fast packets from differing traffic type groups.

BACKGROUND OF THE INVENTION

Typical integrated fast packet networks carry at least three classes of traffic: continuous bit-stream oriented (CBO), voice, and data. FIG. 1A–C illustrates the bandwidth characteristics and requirements of these differing traffic types, and their attributes are summarized as follows.

CBO: Packets from individual sources are fairly well-behaved and arrive at the internodal trunk queues more or less periodically. The peak rate ($R_{peak}$) of multiplexed CBO sources is the same as the average rate ($R_{avg}$), and the trunk bandwidth required ($R_{reqd}$) is somewhat larger to keep the queueing delays small. Since $R_{peak} < R_{reqd}$, no statistical gain is obtained in this case. CBO streams are sensitive to severe fluctuations in queueing delay and to packet losses since both of these cause a loss in synchronization at the receiver. Packets from CBO sources with large packetization times have large delays when multiplexed together as opposed to packets from sources with small packetization times. When multiplexed together, the delays are dominated by the large packetization time sources.

Packet Voice (with speech activity detection): The rate of multiplexed voice depends on the number of sources simultaneously in talk spurt and fluctuates between the maximum rate ($R_{peak}$) and zero. The average rate ($R_{avg}$) is less than half of $R_{peak}$ (for conversational speech). The required rate ($R_{reqd}$) can be made to lie in between these two rates (rather than being made equal to $R_{peak}$), making statistical gain (i.e., $R_{peak}/R_{reqd}$) possible. $R_{reqd}$ is chosen to keep the maximum delay and the packet loss rate under the given limits (a small loss is acceptable since degradation in voice quality can remain within acceptable limits).

Packets with excessive delays (typically a few hundred millisecs) are also dropped at the destination based on an end-to-end delay limit, since voice is delay sensitive. This type of dropping results in (with a high probability) several packets being consecutively lost from the same voice call and degrades the fidelity of the received voice signal seriously.

Framed Data: This type of traffic can have large fluctuations in the rate and in the difference between $R_{peak}$ and $R_{avg}$. $R_{reqd}$ is chosen to keep the end-to-end average frame delays acceptably small. Since the loss of a single fast packet results in of an entire frame, it is not desirable to drop packets. However, since data traffic is bursty in nature, the loss of packets due to the non-availability of buffers cannot be prevented. Additionally, data traffic from different sources have differing quality of service (QOS) requirements; e.g. interactive traffic, is relatively delay sensitive, whereas file transfers are less so.

Integrated networks considered here rely on fast packet technology to transport such packets between end systems. Before the flow of packets between the end systems begins, a connection (or virtual circuit) is established between them. This connection determines the path (i.e., the nodes and internodal trunks) that the fast packets will follow from end to end. FIG. 2 depicts a switch typically used at an intermediate node, that receives fast packets from one or more input trunks and switches them to one or more output trunks.

Packets coming in on an internodal trunk from each connection have a unique field in the header, called the Logical Channel Number (LCN), that corresponds to a logical channel on that trunk (see FIG. 3A). At the time of the establishment of the connection, a table is updated (at each node) that contains entries for the output Port number, the Queue ID (QID) of the output queue, and the new LCN. The LCN of each incoming packet is examined and this address is translated (by access to the table) to the output Port number, QID (for an output queue), and the new LCN for the next internodal trunk (see FIG. 3B).

The packets from the various output queues are transmitted (or discarded) in an order determined by the particular queueing discipline used in the network. (Though this invention is described with this environment in mind, the queueing discipline structure and methods described herein are applicable to a broad class of connection oriented or connection-less networks and are not limited to an implementation using LCNs and table lookups).

For example, one technique for queueing packets for transmission on an internodal trunk uses a first-in-first-out (FIFO) queue. Multiplexed voice and data traffic, however, experience overload periods when the instantaneous rate of packets entering a trunk becomes larger than $R_{reqd}$ (which corresponds to the trunk bandwidth allocated to that traffic). The overload periods for voice can be expected to last from 10 ms to 1000 ms. For data, the periods can last from a few ms to several seconds. CBO sources are sensitive to fluctuations in queueing delays that vary between 1 ms and 32 ms per hop in typical T1 networks (when CBO sources alone are multiplexed into the same queue). Clearly, long overload periods for voice and data caused by a simple FIFO queue could make CBO queueing delay fluctuations as long as the overload periods, and would cause the end-to-end delays to be unacceptable high, since a longer smoothing delay would be required at the destination to prevent gaps from occurring during the bit-stream. Similarly, when data goes into overload, it dominates the trunk bandwidth and causes voice quality to deteriorate (since it would cause voice packets to be delayed or dropped). These clearly undersirable characteristics occur when all the traffic enters one queue.

Another approach uses pure Head Of Line Priority (HOLP) to give data priority over voice. However, HOLP does not solve the problem of data and voice queues affecting the QOS of each other and of CBO when they go into overload. In addition, CBO, voice, and data queues have typical busy periods (1 ms to 32 ms for CBO, 10 ms to 1 sec for voice, and up to a few secs for data) that are not only different but also large enough to cause one type of traffic to dominate the link bandwidth for relatively large amounts of time. For example, if CBO is given highest priority, even though it never goes into overload, a long busy period (say 32 ms) could affect the quality of the voice connections because voice packets could be blocked for 32 ms at that hop. If HOLP was used and voice was given either the highest or second highest priority (it cannot be given the lowest as it is delay sensitive), the voice queue would just take up more bandwidth when it went into overload. Instead of the voice queue growing and losing packets (via a discard mechanism), it would (unfairly) affect the quality of service of the lower priority queues.

Movable boundary schemes for multiplexing two traffic types, voice and data, have also been proposed. In such schemes, the multiplex structure consists of frames that are made of transmission time slots. At the start of the frame, there are S time slots reserved for voice and the next N slots for data. At the start of the frame, if there are S or more voice packets awaiting transmission, they are loaded into the S time slots and data packets are loaded into the remaining N slots (if there are more than N they are queued). If there are less than S voice packets at the start of the frame, data packets are permitted to use the extra timeslots (thus leading to the term "movable boundary"). Such methods neither consider priorities within a class of traffic nor do they propose an efficient discard mechanism.

In another scheme, timers are used to implement the movable boundary between voice and data queues and a block dropping scheme that assumes embedded coding is used for voice. One approach in particular proposes four classes of traffic (with HOLP within each class if required), along with a discard mechanism for the class corresponding to voice traffic. The movable boundary scheme is implemented by limiting the number of packets transmitted in succession from any traffic class.

Queueing structures for virtual circuit (VC) based networks have also been proposed. The queueing disciplines described in these methods separates the VCs into priority classes and uses round-robin scheduling between VC's. This discipline is more appropriate for conventional networks that use link-by-link flow control (as versus fast packet networks that use end-to-end flow control), since the flow into a queue can be tightly controlled. In addition, this discipline does not address the problem of integrating different traffic types to match quality of service requirements and are geared instead to providing fair service to VCs by serving them in a round-robin order before they are multiplexed. This would not work in the environment of the invention since CBO and voice sources cannot be flow controlled and the HOLP discipline between CBO, voice, and data is insufficient (as described earlier).

Packet discarding has also been proposed to relieve congestion in an integrated voice/data network. In such mechanisms, new incoming packets are discarded if the queues becomes excessive (i.e., filled). A disadvantage of this mechanism is that it discards packets without considering the importance of the packet. Using speech coding and speech activity detection, some of the packets contain particularly important information. To reduce the impact of this sort of discarding, a selective packet discarding technique has been proposed. Only the packets considered to be less important for voice waveform reconstruction are discarded in face of congestion, which is identified by the queue depth or the number of calls in talk spurt (i.e., packet arrival rate). In the selective packet discarding, packets are classified into two discard priorities. Both schemes described above use only a single threshold for the indication of congestion.

Pursuant to another packet discarding mechanism, if an output queue of an internodal trunk is full, an incoming packet of the queue is dropped. If the queue is not full but the queue depth exceeds a given threshold and the incoming packet is marked droppable, the packet is also dropped. Otherwise, the packet is placed in the queue waiting for transmission. An alternative for dropping marked packets, referred to as "output dropping" has also been suggested, in which all incoming packets may be placed in the queue if the queue is not full. When a marked packet moves up to the head of the queue and is ready for transmission, the threshold is checked, and the packet will be dropped or transmitted accordingly.

None of the above described methodologies provide fully satisfactory performance, particularly when applied in an integrated fast packet network that supports transmission of varying traffic types.

SUMMARY OF THE INVENTION

These needs and others are substantially met through provision of the fast packet priority queueing, selective discarding, and bandwidth allocation methodology disclosed herein. Pursuant to one embodiment in accordance with the invention, fast packets of differing traffic types are prioritized pursuant to differing prioritization methods vis-a-vis one another. The prioritized packets from each group are then multiplexed and transmitted. For example, a first prioritization method can utilize HOLP, and a second prioritization method can rely upon packet discarding. In the alternative, these approaches can be combined in various ways; for example, a first group of fast packets for a particular traffic type can be prioritized using HOLP alone, and a second group for differing traffic type can be prioritized using both a packet discard mechanism and a HOLP methodology.

In another embodiment, the multiplexing can be accomplished through use of a weighted round-robin bandwidth allocation protocol.

Viewed another way, pursuant to one embodiment of the invention, fast packets for differing traffic types are received and prioritized as a function, at least in part, of a first prioritization method, and fast packets that are queued pursuant to the first prioritization method are then multiplexed in accordance with a bandwidth allocation protocol, such as weighted round-robin. In one embodiment, the first prioritization method could be, for example, HOLP.

In yet another embodiment in accordance with the invention, fast packets for differing traffic types are multiplexed by queuing fast packets for each traffic type in a separate queue, such that queues that contain fast packets for a particular traffic type are grouped together discrete from other traffic types. A first group of queues can then be selected, and a credit count associated with the first group of queues can be examined to determine whether any credit remains therein. If so, one fast packet buffered within a queue corresponding to the highest priority queue in the group that has a packet can be removed and transmitted. Upon transmission, the credit count can be altered in a manner corresponding to the length of the fast packet. For example, in one embodiment, the credit count can be decremented by an amount equal to the number of bytes in the transmitted fast packet. The bandwidth allocation is achieved by incrementing the credit count for a queue group by different amounts for different groups.

BRIEF DESCRIPTION OF THE DRAWINGS

FIGS. 1A-C comprises a depiction of prior art fast packet traffic types;

FIG. 2 comprises a block diagram depiction of a prior art fast packet switch with input analysis and output queue;

FIGS. 3A-B comprises a prior art depiction of a information header as initially received and as subsequently processed by the analysis block for the prior art switch;

DETAILED DESCRIPTION OF THE PREFERRED EMBODIMENT

Figure 4:
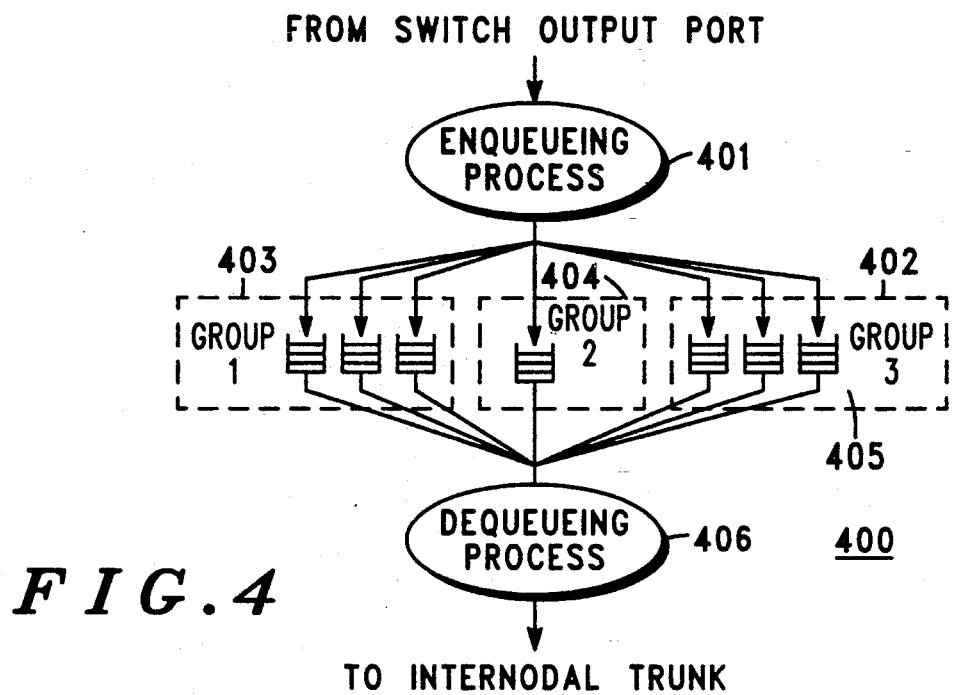
FIG. 4 comprises a depiction of a post-switching queueing and multiplexing process in accordance with the invention.

FIG. 4 provides a general depiction of the enqueueing and dequeueing process contemplated herein (400). Following an appropriate enqueueing process (401), fast packets from various traffic types, such as CBO, voice, and framed data, are buffered in appropriate queues, which queues are segregated into groups (402) that correspond to the differing traffic types. In this example, the first group (403) buffers CBO fast packets, the second group (404) buffers voice fast packets, and the third group (405) buffers framed data fast packets. (Additional description of the various queues will be provided below where appropriate.) The buffered fast packets are then dequeued through use of an appropriate dequeueing process (406) and provided to an internodal trunk to support continued transmission of the dequeued fast packets.

Figure 5:
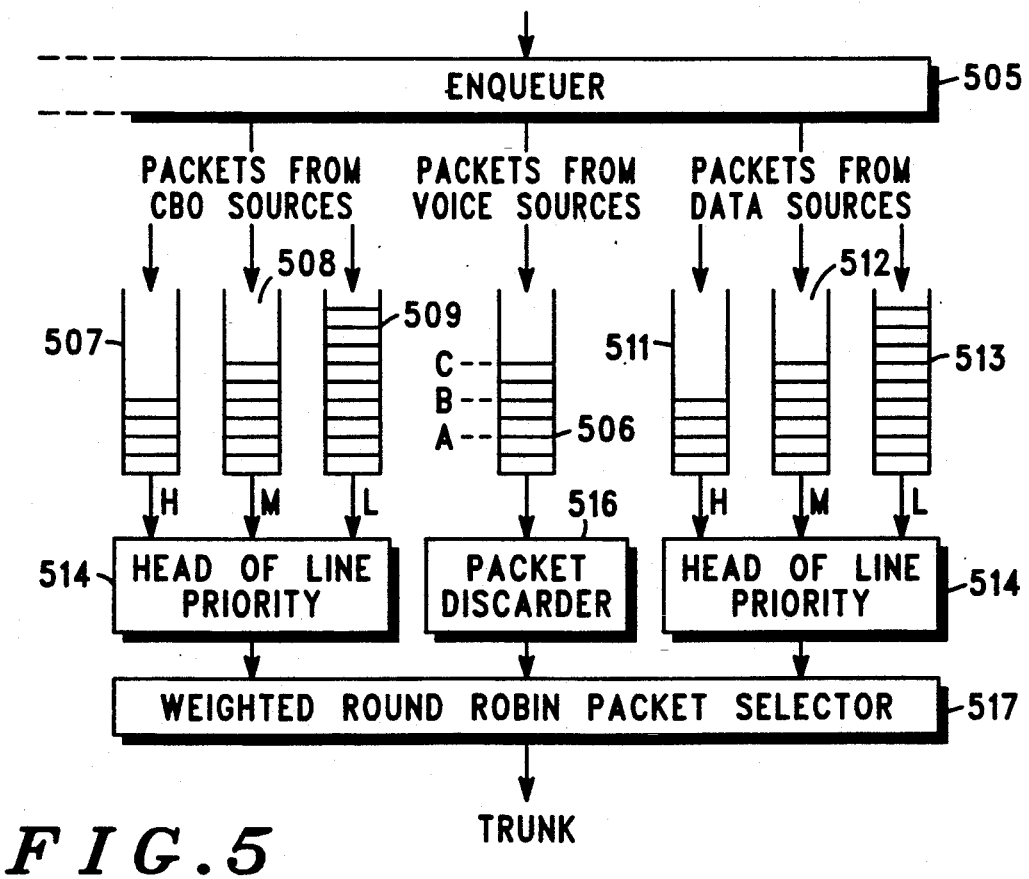
FIG. 5 comprises a block diagram depiction of one possible queueing and multiplexing process in accordance with the invention.

Turning now to FIG. 5, fast packets of different traffic types are routed by a switch and enqueueing process (505) (using the header information) to the appropriate queue. In this embodiment, voice packets are queued into a voice queue (506). The remaining two traffic type groups (CBO and framed data) are each provided with multiple queues (507-9 and 511-13, respectively).

These multiple queues provide the differing quality of service that is required by CBO and data traffic with different characteristics. CBO sources typically have varying packetization times and packet lengths; hence, this system will separate out packets from different sources into more than one queue because the worst case delay for any queue is determined by the largest packetization time for sources multiplexed into that queue. For data, the sources can generate short length data frames (for example, from an interactive terminal application) or large amounts of information (such as file transfers). Both types are not placed in a single queue since an interactive user expects quick response times whereas a file transfer can take longer.

A HOLP service discipline (514) between different data queues (with high priority (511) to short frames) or CBO queues (with a higher priority for queues (507) for sources with low burst size (packetization times)) provides an appropriate quality of service for the different types of traffic in those queues. For example, with three CBO queues (507-9), all packets from sources with packetization times less than 5 ms could be put into the highest priority queue (507), sources with packetization time between 5 ms and 25 ms in the intermediate priority queue (508) and sources with packetization times larger than 25 ms in the lowest priority queue (509). For data, the allocation is done similarly based on average frame lengths. As an example, sources with frame sizes less than 64 bytes could be assigned to the highest priority queue (511), frame sizes between 64 and 512 bytes to the intermediate priority queue (512), and larger than 512 bytes to the lowest priority queue (513).

In general, a HOLP discipline tends to give superior service to the high priority queues (507 and 511) at the expense of degrading the performance of the lower priority queues. In this embodiment, however, the lower priority queues do not experience a severe degradation because the higher priority CBO queues and short data frames in the higher priority data queues have short busy periods.

The voice queue has traffic which is similar (even with different coding rates) and therefore only a single queue is needed.

It will be noted that, in this embodiment, a head of line priority mechanism has not been provided for the voice fast packets, since only one voice fast packet queue (506) has been provided. Instead, a packet discarder (516) has been provided. The functioning of this packet discarder will now be described in more detail with reference to FIG. 6.

Figure 6:
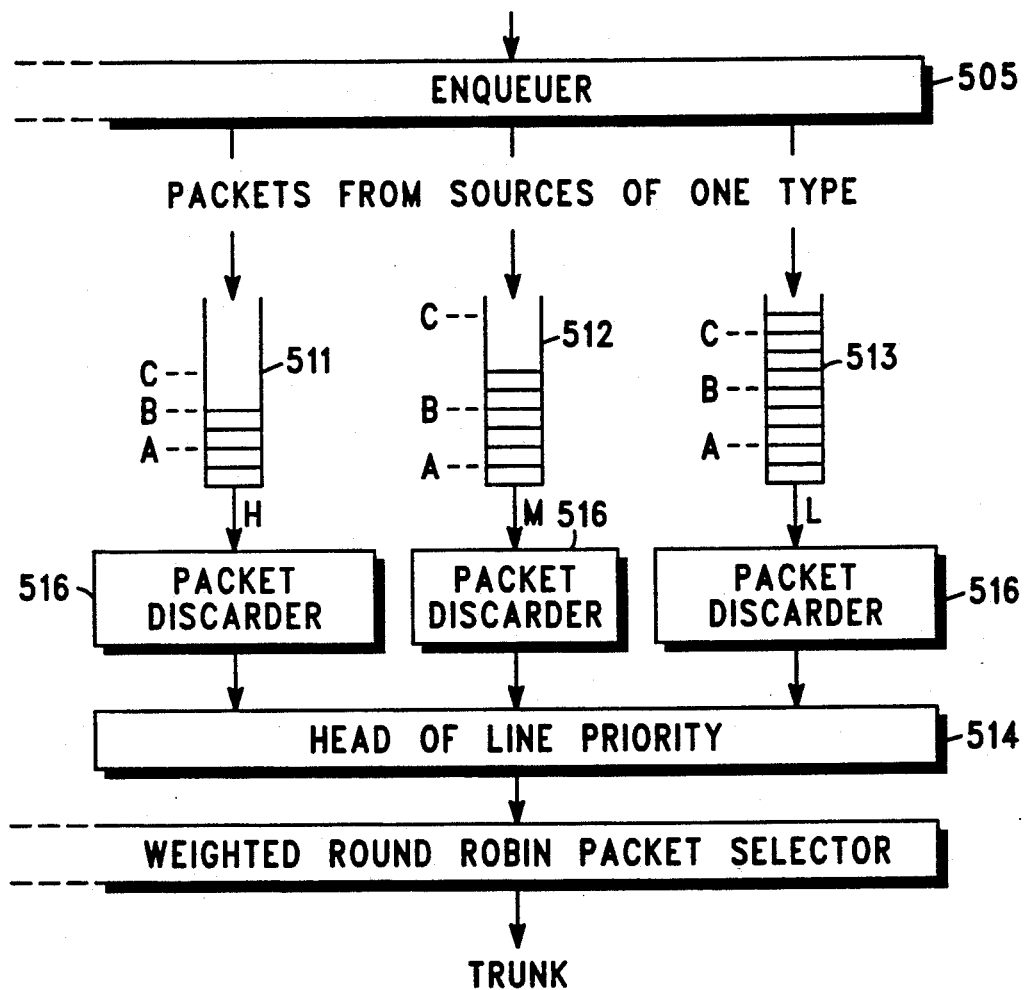
FIG. 6 comprises a block diagram depiction of an alternative embodiment of a queuing and multiplexing arrangement in accordance with the invention.

FIG. 6 depicts an altered embodiment wherein the voice and framed data fast packets are processed through a packet discard mechanism as well as a HOLP service. There are two bits in the header of each fast packet that indicates a discard priority. The data packets are classified into four discard priorities: first, second, third, and last discarded. The voice packets are classified into three discard priorities: first, second, and last discarded. The discard priority is assigned to a packet based on its importance in reconstructing the voice waveform or its effect on the number of retransmitted data frames. A number of water-marks (A-C) corresponding to the discard priorities are provided in the voice and data queues. With this discarding mechanism, all arriving packets are allowed to get into the queue. If the queue is filled (i.e., the last water-mark is exceeded), the packet in the front of the queue is dropped no matter what the discard priority of this packet is. If the queue is not full, packets can be discarded from the front of the queue (based on the water-marks, queue depth, and discard priority of the packet at the front of the queue) at the instant of packet departure from the queue or at the instant of packet arrival to the queue. These are termed departure time discarding and arrival time discarding.

In departure time discarding, the packet discarding is done prior to the departure of a packet. Once the trunk is ready for a packet transmission, the packet in the front of the queue is checked. The discard priority of this packet is read and the current queue depth is compared with the water-mark related to the discard priority of this packet. If the queue depth exceeds the water-mark, the packet is discarded. The next packet in the front of queue is then examined. The procedure repeats until the queue depth does not exceed the water-mark related to the discard priority of a packet in the front of the queue. Finally, this packet is transmitted.

In arrival time discarding, the packet discarding is done after the arrival of a new packet. After the arrival of a new packet, the discard priority of the packet in the front of the queue is read and the current queue depth is compared with the water-mark related to the discard priority of that packet. If the queue depth exceeds the water-mark, the packet is discarded. Unlike departure time discarding, no more packets are checked for discarding. Once the trunk is ready for a packet transmission, the packet in the front of the queue is transmitted. (Packets in a higher priority queue can be discarded, not only based on the queue depth of the queue they are queued in, but also based on the depth of some other queue in the queuing structure. The measurement of the queue depth can be an instantaneous queue depth, or an average queue depth (over some window of time).)

Finally, returning to FIG. 5, this embodiment provides a weighted round-robin (WRR) packet selector (517) to provide a bandwidth allocation service. In effect, the packet selector functions to multiplex fast packets from the various queues and provide them to the trunk for continued transmission.

With WRR, the server serves the queues cyclically in a prescribed order. It examines each queue a specified number of times (proportional to its weight). If all the queues have packets to send, WRR has the effect of dividing the trunk bandwidth among the queues in the ratio of the weights. When some queues are idle, WRR does not waste bandwidth but continues to examine the queues in the prescribed order until it finds a packet. WRR is similar to a conventional TDM system except that timeslots do not go idle-allocated bandwidth unused by one queue can be used by another queue.

To efficiently multiplex additional arbitrary traffic types, one would add a new queue group (that will be served by WRR) if it is found that the traffic type cannot be placed into an existing queue group due to bandwidth usage incompatibilities with the other traffic in that group. This can be done by appropriately characterizing the rate fluctuations and the busy period behavior of the traffic type when identical sources of that type are multiplexed together. Following this, HOLP queues should be created within that group to finely adjust the quality of service (i.e., delay and packet loss) of sources of the same type but with different parameters (note that if these parameters are significantly different for some sources, new traffic types should be defined which are then placed in different queue groups).

The methodology described below determines the order of service of the different queues so that the overall service discipline is a hybrid of WRR and HOLP. Through use of this approach, the queue groups can have variable length packets and still be allocated the required fraction of trunk bandwidth on the average. Also, given that the smallest unit of transmission is a packet, the method attempts to interleave packets as finely as possible so that delay jitter for different queue groups is reduced.

As explained below, a credit counter is maintained for each queue group and this counter is incremented by a certain number of credits at each scan. A queue group can transmit packets when scanned if the number of credits it has is greater than zero. In this embodiment, the credits are measured in bytes. Every time a packet is transmitted, the credit counter is decremented by the number of bytes in the packet. The credit counter is allowed to go negative (if a large size packet is transmitted) but is never allowed to exceed a (positive) maximum value.

The method is described in terms of the enqueueing and dequeueing processes referred to above that perform the task of queueing packets into the output queues and removing a packet from an output queue, respectively. In this description, there is one enqueueing process that moves packets from a switch output port to output queues and one dequeueing process that moves packets from output queues to the output trunk.

A description of the variables used in the following explanation is as follows:

LCN: Logical Channel Number that is in the packet header at an input.

QID: The address of an output queue corresponding to the LCN, obtained from a lookup table.

DP: The discard priority of a packet.

QUEUE LEN(QID): The number of packets queued at some instant in a queue with the address of QID.

WATERMARK(QID,DP): If the QUEUE LEN(QID) for some queue with address QID is greater than WATERMARK(QID,DP), then a packet with discard priority DP can be discarded.

CREDIT[J]: The value of the credit counter for queue group J.

CMAX[J]: The maximum value that CREDIT[J] can attain. This is also the number of credits given to queue group J at each scan. CREDIT[J] is set to CMAX[J] initially.

MAX-Q-GRPS: The total number of queue groups that the enqueueing and dequeueing processes serve.

The proper selection of CMAX[J] allows the groups to have variable packet lengths and also enables the system to interleave traffic from the queue groups in a fine grained manner.

These are precomputed as follows. We define:

L[J] = average packet length (in bytes) in queue group J f[J] = fraction of trunk bandwidth to be allocated to group J when all groups have packets CT = CMAX[1] + CMAX[2] + ... + CMAX[MAX-Q-GRPS].

Since f[J] = CMAX[j]/CT, we have the relation CMAX[I]/CMAX[J] = f[I]/f[J] for all I,J. To obtain the maximum interleaving, the maximum number of packets that can be transmitted together (when other groups have credits and packets waiting) is made as small as possible (i.e., 1 packet). The maximum number of packets that can be transmitted together is max(CMAX[J]/L[J]). CMAX[J]/L[J] = f[J]*CT/L[J] attains its maximum when f[J]/L[J] attains its maximum. The method described below makes use of these relationships to compute the appropriate CMAX[J]s.

I = J for which f[J]/L[J] is maximum;
CMAX[I] = L[I];
for J = 1 to MAX-Q-GRPS do
CMAX[J] = f[J]*CMAX[I]/f[I].

Figure 7:
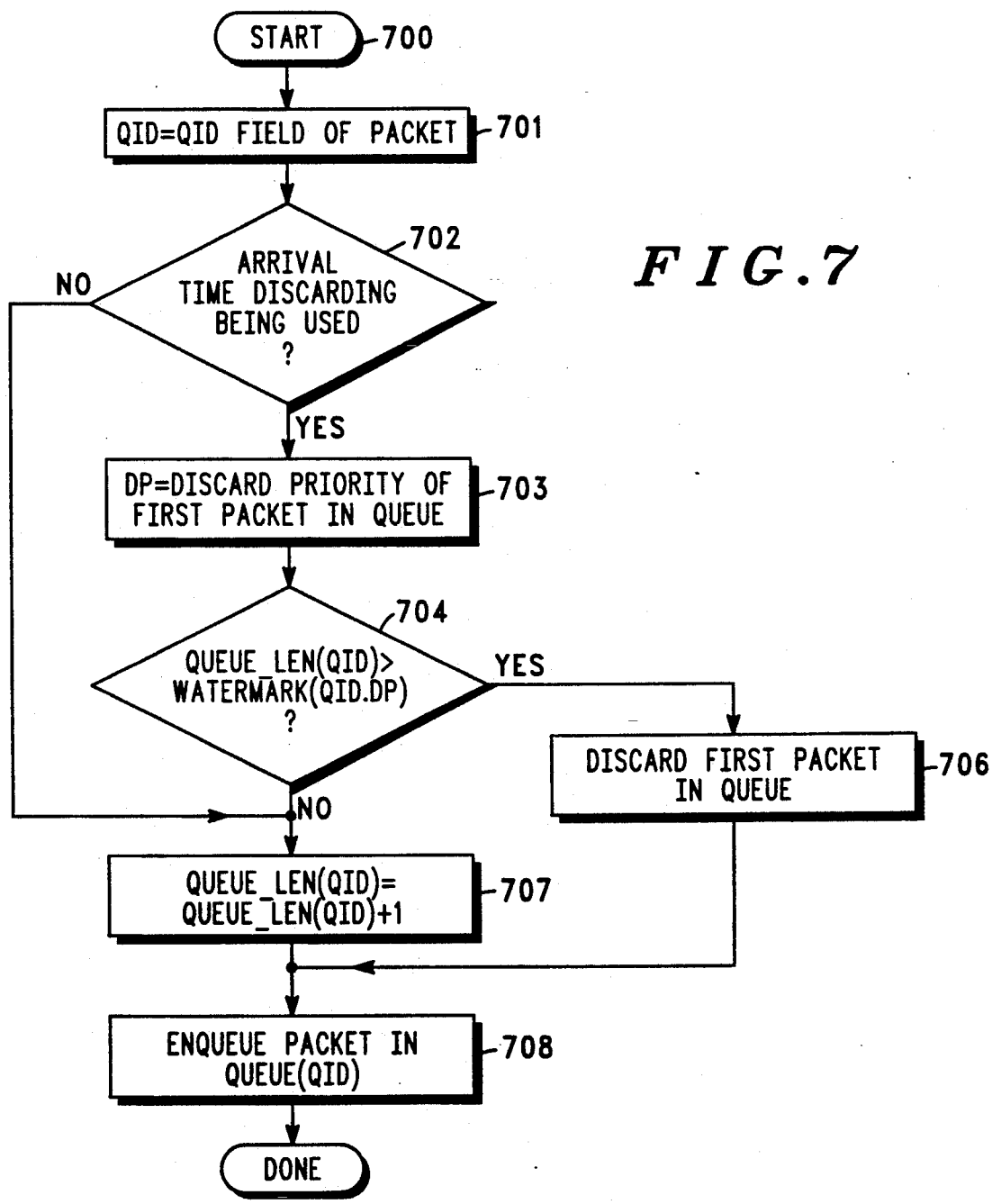
FIGS. 7-9 comprise flow diagrams depicting operation of queuing, discarding, and multiplexing aspects of an internodal switch in accordance with the invention.

The enqueueing process (700) appears in FIG. 7. QID is first set as the QID identified in the packet field (701). If arrival time discarding is being used (702), the discard priority (DP) of the packet in the front of the queue is determined from the corresponding packet field (703). The appropriate queue length is then compared to the appropriate water-mark (704), and if the queue length exceeds the relevant watermark, the packet in the front of the queue is discarded (706). Otherwise, the incoming packet is enqueued (708) and the queue length variable is increased by one packet (707). If arrival time discarding is not being used (702), then the process simply enqueues the incoming packet (708) and again increases the queue length by 1 (707).

Figure 8:
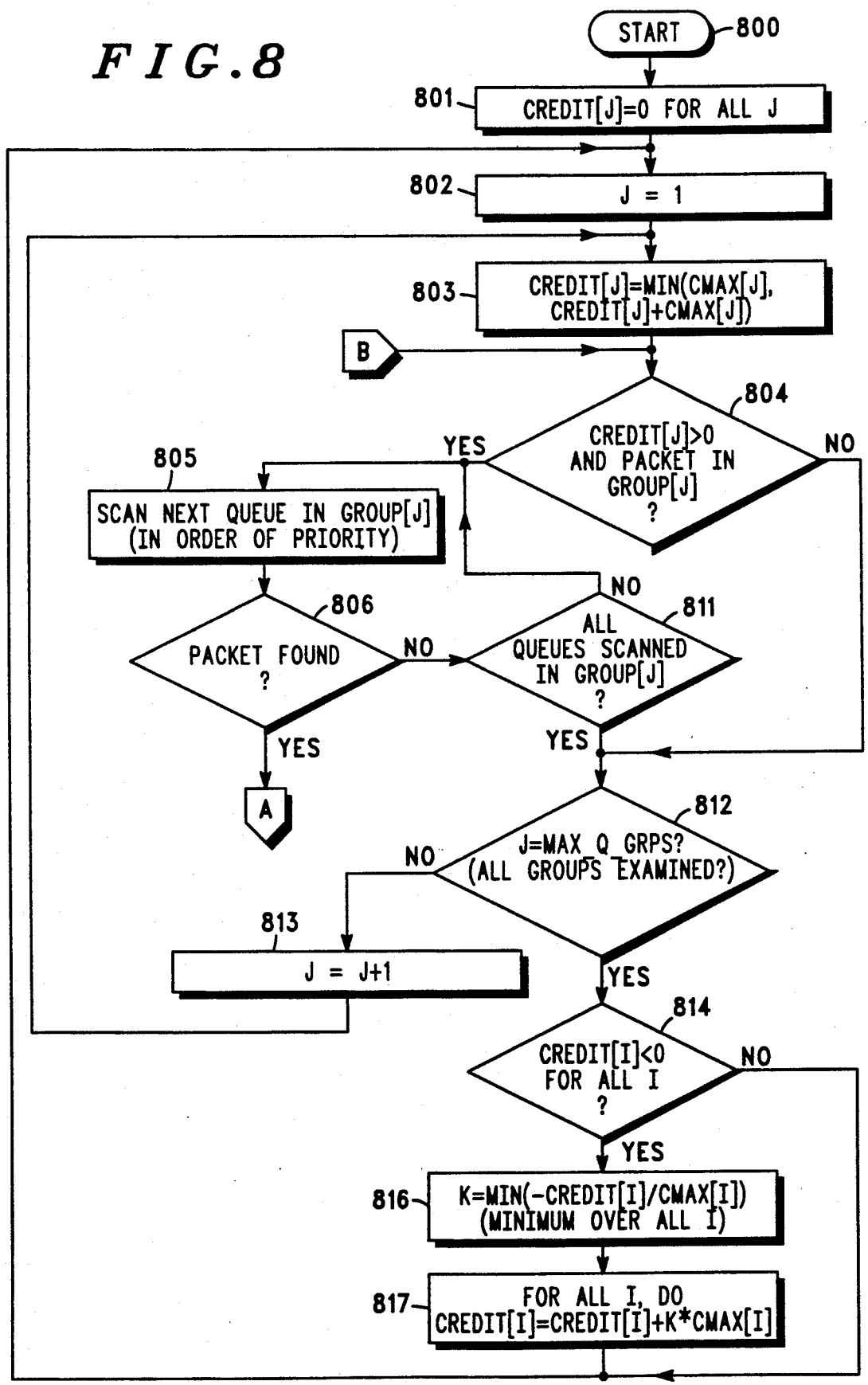
Figure 9:
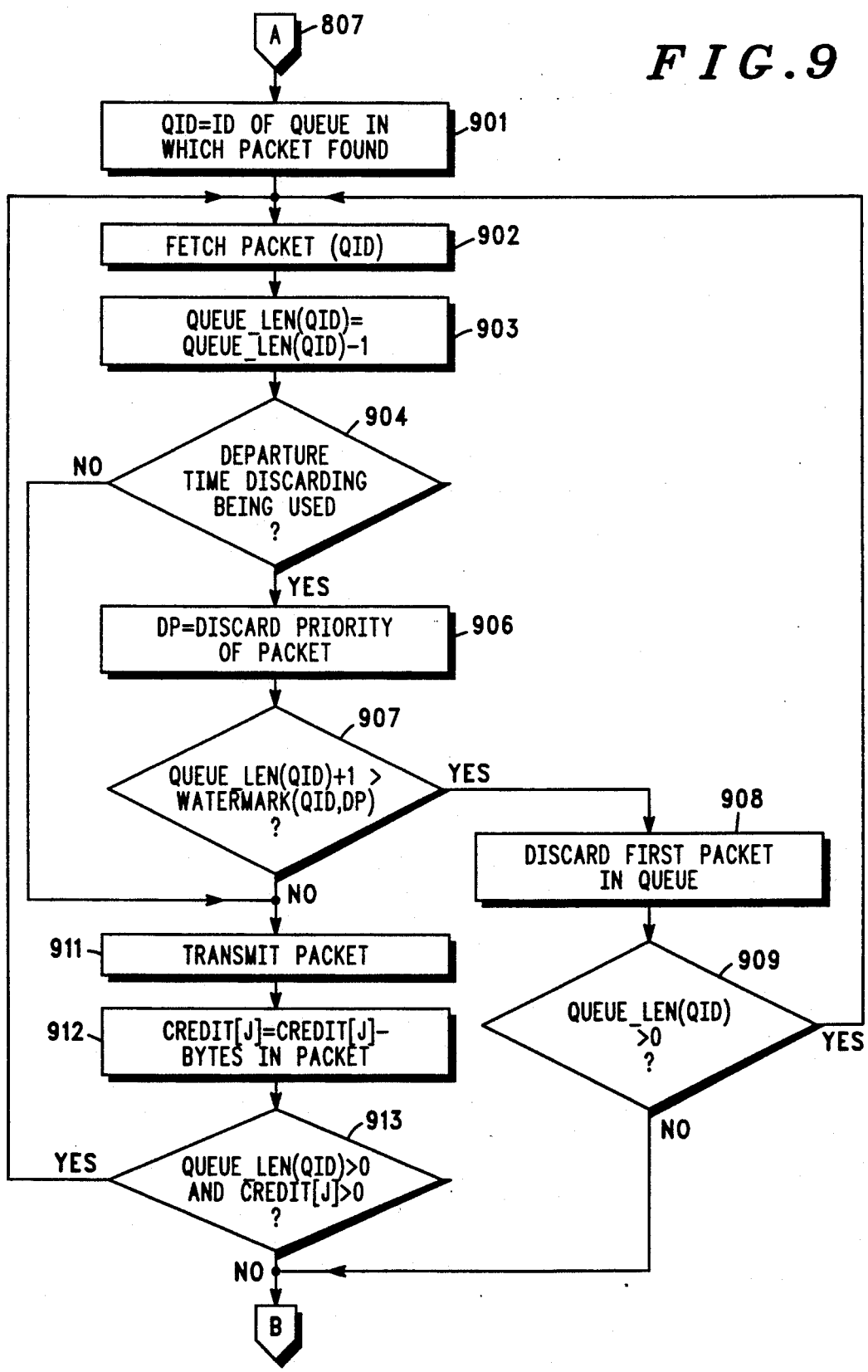

Referring now to FIG. 8, the dequeueing process appears generally as depicted by reference numeral 800. To begin, CREDIT [J] is established as zero for all J's (801). Next, variable J is initialized (802). The credit counter for the selected queue group is then established (803), and the process determines whether positive credit exists for the queue group in question and whether there are any fast packets queued for transmission in the relevant group (804). If true, the process scans the next queue in the selected group (the particular queue being selected in order of priority) (805). When a packet is found (806) the process continues as described in FIG. 9 (807).

QID is established as the ID of the queue in which the packet has been found (901). The appropriate packet is then obtained (902) and the relevant queue length is decremented by one (903) to reflect removal of the selected packet. If departure time discarding is being used (904), the discard priority of the packet is obtained (906) and a determination made as to whether the queue length plus one exceeds the revelant watermark (907). If it does, the first packet in the queue is discarded (908) and a determination then made as to whether the queue length exceeds zero (909). If it does, the next packet is fetched (902) and the process continues as described above. Otherwise, if the queue length does not exceed zero, the process returns.

Assuming the queue length plus one does not exceed the relevant watermark (907), the selected packet will be transmitted (911) and the credit count will be decremented by an amount equal to the number of bytes in the transmitted packet (912). The queue length and the credit count will then be compared to a threshold (such as "0")(913), and if appropriate amounts remain for both, a new packet will be fetched (902). Otherwise, the process will return.

Returning to FIG. 8, the process returns to determine whether any credit remains for this particular queue group (804). Eventually, one of two events will occur. Either no packets will be found (806) and all of the queues in the group will have been scanned (811), or the credit for the group (804) will be completely cleared. In either of these two events, the process will determine whether all queue groups have yet been scanned (812). If not, the queue group identifier will be incremented (813) and the above described process will repeat for the next queue group. Otherwise, when all of the queue groups have been examined, a determination will be made as to whether the credit counters for all queues have all become negative (814). If not, the process will begin again with the first queue group (802). Otherwise, appropriate steps will be taken (816 and 817) to reset the credit counters for all of the queue groups to an initial level, following which the above described procedures will again repeat.

The invention has been described for an application of the queueing discipline at the output of a packet switch. The same techniques are equally applicable in the case of packet switches where the segregation and queueing on the basis of the traffic type is done at the input of the switch.

In addition, the methods described here are not restricted to integrated networks that carry traffic from only CBO, voice, and data sources. For example, compressed video and image/facsimile traffic would be treated as separate traffic types if the network was to carry them. The bandwidth requirements of compressed video fluctuate over time; when successive screens are not very different (for example, a slowly moving object) the bit rate is relatively small. On the other hand, rapidly moving objects or scene changes raise the instantaneous bandwidth requirements to higher levels. In addition, packets from both video and image/facsimile sources can selectively be dropped at the cost of little or no degradation in the image quality.

What is claimed is:

1. A method of post-switching multiplexing fast packets for differing traffic types, comprising the steps of:
    A) receiving first traffic type fast packets from a plurality of first sources;
    B) prioritizing at least some of the first traffic type fast packets pursuant to a first prioritization method, to prioritize first traffic type fast packets for transmission;
    C) receiving second traffic type fast packets from a plurality of second sources, which second traffic type is different from the first traffic type;
    D) prioritizing at least some of the second traffic type fast packets pursuant to a second prioritization method, which second prioritization method is different from the first prioritization method, to prioritize second traffic type fast packets for transmission;
    E) multiplexing and transmitting the first and second traffic type fast packets, wherein the step of multiplexing the first and second traffic type fast packets includes the step of multiplexing the first and second traffic type fast packets pursuant to a weighted round robin bandwidth allocation protocol.

2. The method of claim 1 wherein the first prioritization method comprises a head-of-line prioritization method.

3. The method of claim 2 wherein the second prioritization method includes a packet discarding protocol.

4. The method of claim 3 wherein the packet discarding protocol includes the step of comparing a discard priority for a selected fast packet at the front of a selected fast packet queue with queue depth of at least one other fast packet queue.

5. A method of post-switching multiplexing fast packets for differing traffic types, comprising the steps of:
    A) receiving differing traffic type fast packets;
    B) prioritizing at least some of the fast packets for transmission as a function, at least in part, of a prioritization method, to provide prioritized fast packets;
    C) selecting at least some of the prioritized fast packets for transmission as a function, at least in part, of a bandwidth allocation method, which bandwidth allocation method is different from the prioritization method, to provide multiplexed fast packets; and
    D) transmitting the multiplexed fast packets, wherein:
        a) the first prioritization method comprises a head-of-line prioritization method; and
        b) the bandwidth allocation method comprises a weighted round robin bandwidth allocation mechanism.

6. A method of post-switching multiplexing fast packets for differing traffic types, comprising the steps of:
    A) receiving continuous bit-stream oriented fast packets from a plurality of first sources;

B) prioritizing at least some of the continuous bit-stream oriented fast packets pursuant to a first prioritization method, to prioritize the continuous bit-stream oriented fast packets for transmission;

C) receiving framed data fast packets from a plurality of second sources;

D) prioritizing at least some of the framed data fast packets pursuant to the first prioritization method, to prioritize the framed data fast packets for transmission;

E) multiplexing at least some of the prioritized continuous bit-stream oriented fast packets and framed data fast packets as a function, at least in part, of a bandwidth allocation method, to provide multiplexed fast packets.

7. The method of claim 6, wherein the bandwidth allocation method comprises a weighted round robin bandwidth allocation method.

8. A method of post-switching multiplexing fast packets for differing traffic types, comprising the steps of:

A) receiving continuous bit-stream oriented fast packets from a plurality of first sources;

B) prioritizing at least some of the continuous bit-stream oriented fast packets pursuant to a first prioritization method, to prioritize the continuous bit-stream oriented fast packets for transmission;

C) receiving framed data fast packets from a plurality of second sources;

D) prioritizing at least some of the framed data fast packets pursuant to the first prioritization method, to prioritize the framed data fast packets for transmission;

E) multiplexing at least some of the prioritized continuous bit-stream oriented fast packets and framed data fast packets as a function, at least in part, of a bandwidth allocation method, to provide multiplexed fast packets, wherein:
 a) the first method comprises a head-of-line prioritization method; and
 b) the bandwidth allocation method comprises a weighted round robin bandwidth allocation method.

9. A method of post-switching multiplexing fast packets for differing traffic types, comprising the steps of:

A) receiving continuous bit-stream oriented fast packets from a plurality of first sources;

B) prioritizing at least some of the continuous bit-stream oriented fast packets pursuant to a first prioritization method, to prioritize the continuous bit-stream oriented fast packets for transmission;

C) receiving framed data fast packets from a plurality of second sources;

D) prioritizing at least some of the framed data fast packets pursuant to the first prioritization method, to prioritize the framed data fast packets for transmission;

E) receiving digitized voice fast packets from a plurality of third sources;

F) discarding at least some of the digitized voice packets, from time to time, pursuant to a packet discarding protocol, to provide digitized voice fast packets for transmission;

G) multiplexing at least some of the prioritized continuous bit-stream oriented fast packets and framed data fast packets and digitized voice fast packets, as a function, at least in part, of a bandwidth allocation method, which bandwidth allocation method to provide multiplexed fast packets.

10. The method of claim 9, wherein the first method comprises a head-of-line prioritization method.

11. The method of claim 9, wherein the bandwidth allocation method comprises a weighted round robin bandwidth allocation method.

12. The method of claim 9, wherein:
A) the first method comprises a head-of-line prioritization method; and
B) the bandwidth allocation method comprises a weighted round robin bandwidth allocation method.

13. The method of claim 9 wherein at least some of the digitized voice fast packets include discard priority information, and wherein the packet discarding protocol utilizes the discard priority information to identify packets to discard.

14. A method of post-switching multiplexing fast packets for differing traffic types, comprising the steps of:

A) receiving continuous bit-stream oriented fast packets from a plurality of first sources;

B) storing at least some of the continuous bit-stream oriented fast packets in at least a first queue and a second queue;

C) prioritizing at least some of the continuous bit-stream oriented fast packets as stored in the queues pursuant to a first prioritization method, to prioritize the continuous bit-stream oriented fast packets for transmission;

D) receiving framed data fast packets from a plurality of second sources;

E) storing at least some of the frame data fast packets in at least a third queue and a fourth queue;

F) prioritizing at least some of the framed data fast packets as stored in the third and fourth queues pursuant to the second prioritization method, to prioritize the framed data fast packets for transmission;

G) receiving digitized voice fast packets from a plurality of third sources;

H) discarding at least some of the digitized voice packets, from time to time, pursuant to a packet discarding protocol, to provide digitized voice fast packets for transmission;

I) multiplexing at least some of the prioritized continuous bit-stream oriented fast packets and framed data fast packets and digitized voice fast packets, as a function, at least in part, of a bandwidth allocation method, which bandwidth allocation method to provide multiplexed fast packets.

15. The method of claim 14, wherein the continuous bit-stream oriented fast packets are stored in the first queue and the second queue as a function in part of the packetization time of the CBO sources.

16. The method of claim 15, wherein the continuous bit-stream oriented fast packets from sources having a relatively small packetization time are stored in the first queue, and the fast packets having a relatively large packetization time are stored in the second queue.

17. The method of claim 16, wherein the step of storing the continuous bit-stream packets includes storing fast packets from sources with a relatively medium packetization times in additional queues that are served via HOLP with the first and second queues.

18. The method of claim 14, wherein the framed data fast packets are stored in the third queue and the fourth queue as a function in part of the burst size of the framed data sources.

19. The method of claim 18, wherein the framed data fast packets from sources having a relatively small burst size are stored in the third queue, and the fast packets having a relatively large burst size are stored in the fourth queue.

20. The method of claim 19, wherein the step of storing the framed data packets includes storing fast packets from sources with relatively medium burst sizes in additional queues that are served via HOLP with the third and fourth queues.

21. A method of post-switching multiplexing fast packets for differing traffic types, wherein fast packets for each traffic type are queued in a plurality of queues, such that queues that contain fast packets for a particular type are grouped together in a discrete group, comprising the steps of:
   A) selecting a first group of queues;
   B) determining whether a credit count associated with the first group of queues has any remaining credit contained therein;
   C) when the credit count has credit at least a predetermined amount of remaining therein, determining whether a queue contained within the group has a fast packet queued therein;
   D) when the queue has a fast packet queued therein, removing the fast packet from the queue;
   E) when the fast packet queued in the queue is removed by transmission of the fast packet, altering the credit count.

22. The method of claim 21, wherein the step of altering the credit count includes the step of altering the credit count by an amount related to at least the length of the fast packet.

23. The method of claim 22, wherein step C further includes the step of:
   C1) when the credit count has less than a predetermined amount of credit remaining therein, repeating from step A with a second group of queues.

24. The method of claim 22, and further including the step of:
   F) repeating from step A.

25. The method of claim 24, wherein step C further includes the step of:
   C1) when the credit count has less than a predetermined amount of credit remaining therein, repeating from step A with a second group of queues.

26. The method of claim 25, and further including the step of:
   G) determining whether any of the groups of queues have any credit remaining in their respective credit counts;
   H) when no credit remains with any of the groups of queues, establishing at least a predetermined credit count for at least some of the groups of queues.

27. The method of claim 25, wherein a predetermined credit count is established for each of the groups of queues.

28. The method of claim 27, wherein the predetermined credit count is different for at least some of the groups of queues.

29. The method of claim 22, wherein the fast packets are comprised of bytes and the step of altering the credit count by an amount related to at least the length of the fast packet includes reducing the credit count by an amount proportional to the number of bytes in the removed fast packet.

30. A method of post-switching multiplexing fast packets for differing traffic types, comprising the steps of:
   A) receiving continuous bit-stream oriented fast packets from a plurality of first sources;
   B) prioritizing at least some of the continuous bit-stream oriented fast packets pursuant to a first prioritization method, to prioritize the continuous bit-stream oriented fast packets for transmission;
   C) receiving framed data fast packets from a plurality of second sources;
   D) prioritizing at least some of the framed data fast packets pursuant to the first prioritization method, to prioritize the framed data fast packets for transmission;
   E) multiplexing at least some of the prioritized continuous bit-stream oriented fast packets and framed data fast packets as a function, at least in part, of a bandwidth allocation method, to provide multiplexed fast packets,
   wherein the bandwidth allocation method comprises a weighted round robin bandwidth allocation method.

31. The method of claim 30, wherein the first method comprises a head-of-line prioritization method.

* * * * *

UNITED STATES PATENT AND TRADEMARK OFFICE
CERTIFICATE OF CORRECTION

PATENT NO. : 5,231,633

DATED : July 27, 1993

INVENTOR(S) : Michael G. Hluchyj, Amit Bhargava, and Nanying Yin

It is certified that error appears in the above-identified patent and that said Letters Patent is hereby corrected as shown below:

On the title page, item [75] Inventors:
The inventor's name "Amit Bhargave" should be --Amit Bhargava--.

In the Claims:

At column 11, line 15, insert after "packets" --, wherein the first method comprises a head-of-line prioritization method--.

At column 14, line 9, "claim 25" should be --claim 26--.

Signed and Sealed this

Twenty-sixth Day of April, 1994

*Attest:*

BRUCE LEHMAN

*Attesting Officer*     *Commissioner of Patents and Trademarks*